United States Patent [19]
Drake et al.

[11] Patent Number: 6,063,974
[45] Date of Patent: May 16, 2000

[54] SILYLATED WATER VAPOR TREATED ZINC OR GALLIUM PROMOTED ZEOLITE AND USE THEREOF FOR THE CONVERSION OF NON-AROMATIC HYDROCARBONS TO OLEFINS AND AROMATIC HYDROCARBONS

[75] Inventors: Charles A. Drake, Nowata; An-hsiang Wu, Bartlesville, both of Okla.

[73] Assignee: Phillips Petroleum Company, Bartlesville, Okla.

[21] Appl. No.: 09/060,579

[22] Filed: Apr. 15, 1998

[51] Int. Cl.⁷ ............... C07C 2/52; C07C 4/12; C07C 4/02; C10G 35/06
[52] U.S. Cl. ............ 585/418; 585/407; 585/489; 585/650; 585/651; 585/653; 208/135
[58] Field of Search ................... 585/418, 407, 585/489, 650, 651, 653; 208/135

[56] References Cited

U.S. PATENT DOCUMENTS

| | | | |
|---|---|---|---|
| 3,756,942 | 9/1973 | Cattanach | 208/137 |
| 3,760,024 | 9/1973 | Cattanach | 260/673 |
| 4,975,402 | 12/1990 | Le Van Mao et al. | 502/69 |
| 5,516,736 | 5/1996 | Chang et al. | 502/64 |
| 5,574,199 | 11/1996 | Beck et al. | 585/407 |

FOREIGN PATENT DOCUMENTS

| | | |
|---|---|---|
| 62-115088 | 5/1987 | Japan . |
| 29948 | 4/1995 | Japan . |

OTHER PUBLICATIONS

"Converting Olefinic Light Hydrocarbons to Aromatics", Miyata, T. and Akaishi, T., *Hydrocarbon Technology International Quarterly*, p. 113–114, 116–117 (Winter 1995/96).

*Primary Examiner*—Walter D. Griffin
*Assistant Examiner*—Thuan D. Dang
*Attorney, Agent, or Firm*—Charles W. Stewart; Reece A. Scott

[57] ABSTRACT

A hydrocarbon conversion process in which the rate of coke formation is reduced without a significant sacrifice in light olefin and BTX yield by the use of a silylated, stabilized metal promoted zeolite catalyst. Another embodiment includes a novel silylated spinel/zeolite catalyst. Another embodiment includes a process for producing a zinc or gallium promoted zeolite in which the promoter is stabilized by a high temperature water vapor treatment in the presence of a metal oxide such as alumina and thereafter the stabilized catalyst precursor is calcined and silylated.

6 Claims, No Drawings

SILYLATED WATER VAPOR TREATED ZINC OR GALLIUM PROMOTED ZEOLITE AND USE THEREOF FOR THE CONVERSION OF NON-AROMATIC HYDROCARBONS TO OLEFINS AND AROMATIC HYDROCARBONS

BACKGROUND OF THE INVENTION

This invention relates to water vapor treated metal promoted zeolites. In a more specific aspect it relates to water vapor treated zinc promoted zeolite/alumina compositions. In another aspect it relates to a process for converting non-aromatic hydrocarbons to lower olefin and aromatic hydrocarbons in the presence of a water vapor-treated metal promoted zeolite It is known to catalytically crack non-aromatic gasoline boiling range hydrocarbons to lower olefins (such as ethylene and propylene) and aromatic hydrocarbons (such as benzene, toluene, and xylenes i.e. BTX) in the presence of zeolite catalysts such as ZSM-5, as is described in an article by N. Y. Chen et al in Industrial & Engineering Chemistry Process Design and Development, Volume 25, 1986, pages 151–155. The reaction product of this catalytic cracking process contains a multitude of hydrocarbons such as unconverted C5+ alkanes, lower alkanes (methane, ethane, propane), lower alkenes (ethylene and propylene), C6–C8 aromatic hydrocarbons (benzene, toluene, xylenes, and ethylbenzene), and C9+ aromatic hydrocarbons. Depending upon the relative market prices of the individual reaction products, it can be desirable to increase the yield of certain of the more valuable products relative to the others. Generally it is desirable to enhance the yield of ethylene, propylene and BTX.

Many zeolite catalyst modification techniques are known to enhance one characteristic or another of the catalyst, but they generally tend to cause an undesirable deterioration in other desired characteristics such as selectivity or catalyst life.

Zinc promoted zeolite catalysts for conversion of lower value hydrocarbons to higher value materials such as lower olefins and BTX are well known. Such catalysts, however, deteriorate rapidly during use due to zinc loss and coke formation. A zinc promoted catalyst resistant to zinc loss as a result of a water vapor treatment in the presence of alumina is disclosed in Japanese patent 7-29948, published Apr. 5, 1995. Such catalysts are commercially available from Asahi Chemical Industry Co. under the designation "ALPHA" catalyst.

Coke formation during zeolite catalyzed aromatization of hydrocarbons has continued to be a problem, however.

SUMMARY OF THE INVENTION

It is an object of this invention to provide an improved zeolite catalyst.

It is a further object of this invention is to provide an improved process for the conversion of hydrocarbons.

It is yet a further object of this invention is to provide a zeolite catalyst which is resistant to coke formation during hydrocarbon conversion processes; and It is still yet a further object of this invention is to provide a zeolite catalyst that gives a low coke production rate without a sacrifice in other characteristics such as catalyst life or selectivity.

In accordance with one embodiment of this invention, a promoted zeolite is produced by subjecting a zinc promoter to a high temperature water vapor treatment in the presence of alumina to produce a promoter component and thereafter silylating a zeolite/promoter component composition. In accordance with another embodiment of this invention, a promoted zeolite is produced by combining zeolite, a zinc or gallium promoter and a binder which is capable of forming a spinel with the zinc or gallium promoter, to give a zeolite/promoter/binder composition; subjecting the zeolite/promoter/binder composition to a high temperature water vapor treatment to give a zeolite/spinel promoter composition and thereafter silylating the zeolite/spinel promoter composition.

DETAILED DESCRIPTION OF THE INVENTION

Surprisingly, it has been found that silylation of certain water vapor treated metal promoted zeolites results in a catalyst which exhibits greatly reduced coke formation when used in hydrocarbon conversion processes. For instance, silylation of a zeolite having a water vapor treated zinc-alumina component gives such a catalyst. More remarkably, this reduced coking is accomplished without a sacrifice in the selectivity to desired products.

In accordance with this invention there are three methods, referred to hereinafter as method (1) method (2) and method (3) to provide the zeolite/promoter component composition to be silylated, which methods can be briefly described as follows:

(1) Mix a zeolite, a zinc promoter and alumina; and subject the resulting mixture to a high temperature water vapor treatment to give a zeolite/promoter component composition ready for silylation.

(2) Premix a zinc promoter and alumina; subject the resulting premix to a high temperature water vapor treatment to give a promoter component; and thereafter combine the promoter component with a zeolite to give a zeolite/promoter component composition ready for silylation.

(3) Mix a zeolite, a zinc or gallium promoter and a binder capable of forming a spinel with the zinc or gallium promoter; and subject the resulting mixture to a high temperature water vapor treatment to give a zeolite/spinel promoter composition ready for silylation.

Alternatively, in the practice of methods (2) and (3), a commercial spinel can be utilized as the promoter component. Zinc aluminate spinel, for instance is widely used in industry and is readily available in commercial quantities The zeolite starting material used in the composition of the invention includes any zeolite which is effective in the conversion of non-aromatics to aromatics when contacted under suitable reaction conditions with non-aromatic hydrocarbons. Preferably, the zeolite has a constraint index (as defined in U.S. Pat. No. 4,097,367, which is incorporated herein by reference) in the range of about 0.4 to about 12, preferably about 2–9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is about 8:1 to about 200:1, more preferably about 40:1 to about 70:1. Preferred zeolites include ZSM-5, ZSM-8, ZSM-11, ZSM-12, ZSM-35, ZSM-38, and mixtures thereof. ZSM-5 zeolite is also known as "MFI" or "Pentasil" zeolite. The zeolites can also be described as crystalline aluminosilicates. Suitable aluminosilicates generally have a medium pore size, generally being an effective fine porous size of 5–6.5 angstroms, although small (generally 3–5 Å) or large pore (generally 7–8 Å) zeolites can also be used. The presently preferred zeolite is ZSM-5. While currently less preferred, silicoaluminophosphate zeolites such as SAPO-11 can also be used.

The zinc or gallium promoter component can be in the form of elemental zinc or gallium, a salt, oxide or hydroxide or it can be an organic compound. Preferably the metal is zinc. Examples of suitable modifiers include zinc oxide, zinc nitrate, zinc chloride, zinc acetate, zinc oxalate, zinc acetylacetonate hydrate, zinc bromide, zinc carbonate, zinc hydroxide, zinc borate, zinc silicate, zinc aluminate, zinc chromite, zinc cyclohexanebutyrate dihydrate, zinc 2-ethylhexanoate, zinc fluoride, zinc hexafluoroacetylacetonate dihydrate, zinc iodide, zinc molybdate, zinc naphthenate, zinc perchlorate hexahydrate, zinc phosphate hydrate, zinc phosphide, zinc protoporphyrin, zinc sulfate monohydrate, zinc sulfide, zinc telluride, zinc tetrafluoroborate hydrate, zinc titanate, zinc trifluoromethanesulfonate and alklyzincs as well as corresponding compounds of gallium such as gallium oxide, gallium chloride and gallium nitrate. Currently preferred are zinc chloride and zinc nitrate. Mixtures of two or more zinc compounds, two or more gallium compounds or a mixture of one or more zinc compounds and one or more gallium compounds can also be used.

The suitable amount of zinc or gallium promoter for the present invention is generally 1–10 wt % as metal based on the total weight of the zeolite/promoter component composition, with 1–6 wt % being preferred. By total weight of the zeolite/promoter component composition is meant the calcined product containing the zeolite and the promoter component after the high temperature water vapor treatment whether produced by method (1) or method (2), i.e., just prior to incorporating the silylating agent. Amounts less than 1 wt % could be used, i.e. as little as 0.1 wt % but the benefit in the hydrocarbon conversion utility would be greatly reduced. Similarly, more than 10 wt %, i.e. up to at least 25 wt % could be used if desired for other reasons, but little, if any, additional benefit in the hydrocarbon conversion utility would result. With method (3) the total weight would be based on the weight of the composition just prior to silylation less the weight of any unreacted binder, it being contemplated that generally an excess of binder is used so that after the high temperature water vapor treatment the binder which is generally required in the final product is already present. Alternatively, just enough binder could be used for the reaction with the zinc or gallium promoter to give the spinel.

The three methods of obtaining the modified zeolite composition for silylation described briefly hereinabove can be carried out as follows:

Method (1) Combine the zeolite, the zinc promoter component, and the alumina by any conventional method such as ion exchange, impregnation, and kneading and thereafter subject the resulting mixture to the water vapor treatment. Generally a sol of the alumina is admixed with dry powder zeolite and the zinc promoter component. Alternatively, an aqueous solution of the zinc promoter can be used. The zeolite, zinc promoter component and alumina can be all three mixed together initially or any two can be mixed together and thereafter the third mixed therewith. Preferably the mixing should be carried out until at least essentially complete mixing results. This mixture is then given the water vapor treatment as hereinafter more fully described.

Method (2) The zinc promoter component and the alumina are mixed as described above, preferably by a conventional method such as impregnation of the alumina with an aqueous solution of the zinc component given the water vapor treatment and thereafter the zeolite is incorporated therewith by any conventional means such as dry mixing.

Method (3) Combine the zeolite, the zinc or gallium promoter component, and binder by any conventional method such as ion exchange, impregnation, or kneading and thereafter subject the resulting mixture to the water vapor treatment. Generally a sol of the binder is admixed with dry powder zeolite and the zinc or gallium promoter component. Alternatively an aqueous solution of the promoter can be used. The zeolite, zinc or gallium promoter component and binder can be all three mixed together initially or any two can be mixed together and thereafter the third mixed therewith. Preferably the mixing should be carried out until at least essentially complete mixing results. This mixture is then given the water vapor treatment.

The water vapor treatment must be carried out it a high temperature. The temperature must be above 125° C. and is generally within the range of about 300–900° C., preferably 500–800° C., more preferably 550–700° C. the time must be sufficient to effect the metal stabilization and will generally be from 0.1–50 hours, preferably from 0.5–15 hours, more preferably 1–10 hours. Within these ranges, shorter times can be used toward the upper end of the temperature range and longer times at the lower end of the temperature range. A partial pressure of water vapor of 0.1–10 kg/cm$^3$ can be used. This treatment is usually done in water vapor alone. However, the treatment can be done with water vapor in the presence of a diluent such as nitrogen or air. This water vapor treatment can also be viewed as a steam treatment carried out under a pressure in the range of from subatmospheric to about 3000 psia. Preferably, the steam is not a saturated steam but is superheated steam.

As between methods (1) and (2), method (2) is generally preferred over method (1) because the high temperature water vapor treatment tends to remove alumina from the backbone of the zeolite (framework alumina). In instances where such removal is undesired, carrying out the vapor treatment before incorporating the zeolite offers an advantage. Of course, in instances where it might be desired to reduce framework alumina in the zeolite, method (1) would be preferred.

In all embodiments of this invention, the zeolite can be acid leached or non acid leached. Acid leaching also can remove framework alumina, but acid leaching also removes alumina from the pores of the zeolite. Blocked pores can inhibit access of the reactants to the reactive sites in the pores and hence acid leaching to remove this "extra-framework" alumina can be advantageous.

Any suitable means can be used to treat the zeolite starting material with acid. It is preferred for the zeolite to be soaked with an acid solution by any suitable means known in the art for contacting the zeolite with such acid solution. The acid solution used to treat the zeolite can be a solution of any acid that suitably provides for the leaching of aluminum atoms from the zeolite crystalline structure. Examples of such suitable acids include sulfuric, phosphoric, nitric and hydrochloric. The preferred acid solution is aqueous hydrochloric acid. The zeolite is soaked in the acid solution for a period of from about 0.25 hours to about 10 hours. After soaking, the resultant acid treated zeolite is washed free of the acid and then can be dried or calcined, or both.

It is essential to the invention that the metal modified zeolite, whether produced by method (1), (2) or (3) be silylated in order to reduce the coke forming tendencies of the catalyst. This silylation can be carried out by precalcining the metal modified zeolite prior to silylation or by silylating a plurality of times. After each silylation, the silylated composition is generally dried and calcined so with multiple silylations, the composition is precalcined for all of the silylations subsequent to the first as a result of the post calcination of the prior silylation.

The silylating agent can be any suitable silicon containing compound that effectively treats the metal modified zeolite so as to provide a silylated, metal modified zeolite that is effective in gaining a low rate of coke formation when used in converting hydrocarbons such as gasoline to aromatics and olefins. More particularly, the silylating agent is an organosilicon compound selected from compounds having the following molecular formulas:

$$SiR_yX_{4-y} \text{ and } (R_wX_{3-w}Si)_2Z$$

wherein:

y=1 to 4;

w=1 to 3;

R=alkyl, aryl, H, alkoxy, arylalkyl, and where R has from 1 to 10 carbon atoms;

X=halide; and

Z=oxygen or imino or alkylimino or alkanoylimino.

The preferred silylating agent is selected from the group of tetra alkyl orthosilicates, $Si(OR)_4$, and poly(alkyl) siloxanes. The most preferred silylating agents are tetraethyl orthosilicate, also known as tetraethoxysilane, and poly (phenylmethyl)siloxane. All of these silylating agents are commercially available, the siloxanes being available from Dow Chemical Co. under tradenames such as Dow 200, Dow 510, Dow 550 and Dow 710. Other representative examples are dimethyl silicone, diethyl silicone, phenylmethyl silicone, methylhydrogen silicone, ethylhydrogen silicone, phenylhydrogen silicone, methylethyl silicone, phenylethyl silicone, diphenyl silicone, methyltrifluoropropyl silicone, ethyltrifluoropropyl silicone, polydimethyl silicone, tetrachlorophenylethyl silicone, tetrachlorophenylmethyl silicone, tetrachlorophenylhydrogen silicone, tetrachlorophenylphenyl silicone, methylvinyl silicone and ethylvinyl silicone. Examples of cyclic silicones include hexamethyl cyclotrisiloxane, octamethyl cyclotetrasiloxane, hexaphenyl cyclotrisiloxane and octaphenyl cyclotetrasiloxane. Mixtures of these material can also be used.

The preferred method of silylating the zeolite/modifier component is to impregnate it with a solution of the silylating agent by any standard incipient wetness technique known in the art. The solution may be an aqueous solution or a hydrocarbon solution of the silylating agent. It is preferred, however, for the silylating agent to be insoluble in water but soluble in hydrocarbon. Any suitable hydrocarbon solvent can be used including, for example, aromatics and other hydrocarbons having from 4 to 10 carbon atoms per molecule including alkanes, cycloalkanes and olefins. The most preferred hydrocarbon solvent is cyclohexane. The concentration of silylating agent in the solution can range upwardly to the solubility limit of the silylating agent in the solvent. Preferably, the concentration of the silylating agent in the solution can be in the range from about 1 weight percent to about 99 weight percent. Most preferred, the concentration of silylating agent in the solvent is from 5 to 25 weight percent.

The amount of silylating agent incorporated into the metal modified zeolite should be such as to provide a silylated, zeolite catalyst that effectively provides a low rate of coke formation during its use in the conversion of hydrocarbons such as gasoline to aromatics and olefins. Generally, the silylating agent can be present in the metal modified zeolite composition after calcining in an amount upwardly to about 50 weight percent, calculated as $SiO_2$, of the resulting silylated zeolite catalyst. Preferably, the amount of silylating agent incorporated into the zeolite catalyst can be in the range of from about 0.5 weight percent to about 40 weight percent and, most preferably, from 5 weight percent to 25 weight percent based on the total weight of the final zeolite catalyst. Generally, if a single impregnation is used the amount is toward the lower end of these ranges and if enough multiple impregnations are used it is toward the upper end. The silylation is carried out from 1–20 times or more, preferably 2–10, more preferably 3–7 times.

After the incorporation (or each incorporation in the case of the preferred multiple incorporations) of silylating agent into the zeolite, the thus impregnated zeolite can be dried at suitable drying conditions, generally in the presence of air, and then calcined. The drying temperature generally ranges from about 20° C. to about 125° C. and is generally performed over a time period of from 0.1 hours to 4 hours. The calcination temperature is generally in the range of from about 300° C. to about 700° C. The calcination can be performed in an air atmosphere for a time period of from 0.1 hours to 10 hours. While this step is referred to as "calcination" which implies heating in an oxygen-containing atmosphere, and while air is preferred for convenience, this is primarily a drying step in the precalcination and hence an inert atmosphere could be used if desired. While not wanting to be bound by theory, it is believed that the silylating agent reacts with acid sites on the surface and/or in the pores of the zeolite to alter the surface chemistry and water interferes with this reaction. Hence "calcination" carried out prior to a silylation step is designed to render the composition anhydrous or at least essentially anhydrous preparatory to the subsequent silylation. Hence it is highly preferred that a precalcination be carried out prior to the first silylation step. This is especially important where there is to be only one silylation. The post calcination (after the final silylation and drying) can be carried out under times and temperatures within the ranges set out for the precalcination, and for convenience the atmosphere is generally the same, i.e. air although it can be essentially inert. There is an oxidation component here, however, since the silylation agent is being converted to an oxidized form. A calcination step can be carried out prior to the water vapor treatment if desired.

In an alternative embodiment, the silylated zeolite is given a high temperature water vapor treatment in addition to, or instead of, the water vapor treatment described hereinabove. The conditions for such water vapor treatment are the same as for the water vapor treatments of methods (1), (2) and (3) described hereinabove.

The inorganic binder (also called matrix material) is well known in the art. Any binder containing ingredients which form a spinel with the modifier metal can be used in forming the promoter component in method (3). Generally these binders are selected from the group consisting of alumina, silica, silica-alumina, clays (such as bentonite), aluminum phosphate and mixtures thereof. With methods (1) and (2) these and any other known binders can be combined with the silylated promoted zeolite for their usual purpose as a binder. Any known binder can also be used in method (3) after the silylated promoted zeolite is formed if additional binder is desired.

The inorganic binder facilitates forming the product into the form desired for a particular utility. For instance it may be desired to extrude and pelletize the product for use as a catalyst and the binder facilitates the extrusion and adds physical stability to the resulting catalyst pellets.

The binder material, which in this invention functions as an essential part of the catalyst preparation in method (3) is most preferably alumina. Either anhydrous alumina or hydrated alumina can be used. In addition an alumina precursor that can produce either anhydrous alumina or hydrated alumina from hydrolysis, thermal decomposition, or oxidation can be used.

The amount of binder, is suitably 2–50 w %, preferably 5–40 wt % based on total catalyst weight after the silylation and final calcining.

The ratio of ingredients is preferably further defined such that the molar ratio of binder to promoter metal is 1 or more. For example, with the zinc compound promoter and the alumina reactant of methods (1) and (2) and preferred zinc compound-alumina "reactant-binder" of method (3), the molar ratio of $Al_2O_3$:Zn is 1 or more. Thus, for example with the lower end of the 2–50 wt % range of alumina, i.e. 2 wt % and the lower end of the 1–10 wt % range for zinc, i.e. 1 the molar ratio would be 0.02:0.015 or 1.33.

Zeolites contain silicon atoms bound to four oxygen atoms in their framework structure. The silylating agent, after calcination is at least partially converted to $SiO_2$. Silica, in some embodiments, can be a binder. These three forms of silicon materials are all different. The silicon-oxygen structure in the zeolite is a permanent and fundamental part of the zeolite which is a part of what gives it its precise porous structure and thus makes zeolites so useful. The binder, whether alumina, silica, bentonite or something else acts as a "glue" to hold the zeolite particles together. While it surrounds the zeolite particles as a cohesive matrix it does not adhere to the surface and is not capable of entering into the pores. Hence it does not significantly affect the catalytic properties of the zeolite per se, although in some instances it may provide an additional catalytic function. The silicon atoms of the silylating agent are in the form of a compound, generally in solution, and can contact the surface and enter the pores on a molecular level and attach to acid sites on the surface of the zeolite. On subsequent calcination they do affect the basic catalytic functions of the zeolite. This is because, while now in the form of $SiO_2$ attached to remnants of the acid sites, they are in the form of individual $SiO_2$ units chemically bound to the zeolite surface.

The silylated zeolite of this invention can contain other conventional additives of the type known in the art for zeolite catalysts. For example a hydrogenation/dehydrogenation component such as platinum can be included in the composition.

The following two specific procedures are set out as non limiting illustrative embodiments of this invention.

In accordance with the first of these specific procedures, both zinc nitrate (equivalent to 4.6 g of zinc metal) and alumina sol (equivalent to 50 g of $Al_2O_3$) can be mixed and kneaded with 200 g of an ammonium-ion-type ZSM-5 crystalline aluminosilicate ($SiO_2/Al_2O_3$ molar ratio: 70); then the mixture can be extruded for molding (diameter: 1.6 mm, length: 4–6 mm). The product can be dried at 120° C. for 4 hours, then sintered at 500° C. for 3 hours. Thereafter, 20 g of the product can be introduced into a quartz glass reactor (inner diameter: 12 mm) and heat-treated for 1 hour at 650° C. under an atmosphere containing a gas mixture of water vapor (80 vol %) and nitrogen to produce a catalyst precursor having 1.8 wt % zinc. This catalyst precursor can be silylated as described herein to produce a catalyst. Alternatively, zinc nitrate (equivalent to 9.9 g of zinc metal) can be used to give a higher zinc content.

In accordance with the second of these specific procedures, 240 g of a 16.4 wt % zinc nitrate aqueous solution can be added to 50 g of gamma-alumina, evaporated and solidified, dried at 120° C. for 4 hours, and then sintered at 500° C. for 3 hours. Then, following molding by compression, the product can be crushed and filtered with a filter (9–20 mesh); then 20 g of the product can be introduced into a quartz glass reactor with an inner diameter of 12 mm and heat-treated at 650° C. for 5 hours in an atmosphere in a gas mixture of water vapor containing 80 volume % water vapor and nitrogen. Then, 5 g of the gamma-alumina containing zinc and treated with the water vapor can be mixed with 35 g of a proton form of ZSM-5 crystalline aluminosilicate ($SiO_2/Al_2O_3$ molar ratio of 40), and stirred in a mortar; it can then be molded my compression and crushed to produce a catalyst precursor (9–20 mesh). This precursor can then be silylated as described herein.

The silylated zeolites produced in accordance with this invention are particularly useful in hydrocarbon conversion processes where lower value feedstocks are converted to lower olefins and BTX, because these zeolites exhibit lower coke formation without a sacrifice in other characteristics.

Any suitable hydrocarbon feedstock which comprises paraffins (alkanes) and/or olefins (alkenes) and/or naphthenes (cycloalkanes), wherein each of these hydrocarbons contains 2–16 carbon atoms per molecule can be used as the feed to be contacted with the inventive zeolite compositions under suitable process conditions for obtaining a reaction product comprising lower alkenes containing 2–5 carbon atoms per molecule and aromatic hydrocarbons. Frequently, these feedstocks also contain aromatic hydrocarbons. Non-limiting examples of suitable, available feedstocks include gasolines from catalytic oil cracking (e.g., FCC and hydrocracking) processes, pyrolysis gasolines from thermal hydrocarbon (e.g., ethane, propane, and naphtha) cracking processes, naphthas, reformates, straight-run gasoline and the like. The preferred feed is a gasoline-boiling range hydrocarbon feedstock suitable for use as at least a gasoline blend stock generally having a boiling range of about 30–210° C.

The hydrocarbon feed stream can be contacted by any suitable manner with the inventive zeolite compositions described herein contained within a reaction zone. The contacting step can be operated as a batch process step or, preferably, as a continuous process step. In the latter operation, a solid catalyst bed or a moving catalyst bed or a fluidized catalyst bed can be employed. Any of these operational modes have advantages and disadvantages, and those skilled in the art can select the one most suitable for a particular feed and catalyst. No significant amount of hydrogen gas is required to be introduced with the feed into the reaction zone of the contacting step, i.e., no $H_2$ gas at all or only insignificant trace amounts of $H_2$ (e.g., less than about 1 ppm $H_2$) which do not significantly affect the processes are to be introduced into these reactors from an external source.

The contacting step is preferably carried out within an aromatization reaction zone, wherein is contained the novel zeolite composition, and under reaction conditions that suitably promote the aromatization of at least a portion of the hydrocarbons of the hydrocarbon feed. The reaction temperature of the contacting step is more particularly in the range of from about 400° C. to about 800° C., preferably, from about 450° C. to about 750° C. and, most preferably, from 500° C. to 700° C. The contacting pressure can range from subatmospheric pressure upwardly to about 500 psia, preferably, from about atmospheric to about to about 450 psia and, most preferably, from 20 psia to 400 psia.

The flow rate at which the hydrocarbon feed is charged to the aromatization reaction zone is such as to provide a weight hourly space velocity ("WHSV") in the range of from exceeding 0 hour$^{-1}$ upwardly to about 1000 hour$^{-1}$. The term "weight hourly space velocity", as used herein, shall mean the numerical ratio of the rate at which a hydrocarbon feed is charged to a reaction zone in pounds per hour divided by the pounds of catalyst contained in the reaction zone to which the hydrocarbon is charged. The preferred WHSV of the feed to the contacting zone can be in the range of from about 0.25 hour$^{-1}$ to about 250 hour$^{-1}$ and, most preferably, from 0.5 hour$^{-1}$ to 100 hour$^{-1}$.

The following examples are presented to further illustrate this invention and are not to be construed as unduly limiting its scope.

EXAMPLE I

This example illustrates the preparation of several catalysts which were subsequently tested as catalysts in the conversion to aromatics of a gasoline sample, which had been produced in a commercial fluidized catalytic cracking unit (FCC).

Catalyst A was a commercial zinc promoted zeolite sold by the Asahi Chemical Industry under the designation "Alpha" catalyst Lot ASZ-9613.

Catalyst B was the Alpha catalyst treated once with a poly(phenylmethyl)siloxane sold by Dow Chemical under the tradename Dow 510, and referred to hereinafter as "PPMS". This catalyst was not calcined (precalcined) before the PPMS treatment. The treatment was carried out using a 50 wt % solution of the PPMS in cyclohexane and after impregnation of the Alpha catalyst to incipient wetness it was dried and calcined at 538° C. for 6 hours.

Catalyst C was identical to Catalyst B except it was precalcined at 538° C. for 6 hours.

Catalyst D was identical to Catalyst C except a 10 wt % siloxane concentration was used and it was given five successive "precalcine-impregnate-dry-calcine" treatments.

Catalyst E was identical to catalyst B except that the silylating agent was the monomeric silicate, tetraethylorthosilicate

EXAMPLE II

This example illustrates the use of the zeolite materials described in Example I as catalysts in the conversion of a gasoline feed to benzene, toluene and xylenes (B.TX) and lower olefins (ethylene, propylene).

A sample of 5.0 g of each of the catalyst materials described in Example I was placed into a stainless steel tube reactor (length: about 18 inches; inner diameter: about 0.5 inch). Gasoline (density: 0.73 g/cc; containing about 4.2 weight-% C4–C13 normal paraffins, about 25.4 weight-% C4–C13 isoparaffins, about 25.4 weight-% C4–C9 olefins, about 9.5 weight-% C5–C12 naphthenes and about 32.7 weight-% C6–C12 aromatics) from a catalytic cracking unit of a refinery was passed through the reactor at a flow rate of about 14 m$^2$/hour, at a temperature of about 600° C. and at atmospheric pressure (about 0 psig). Thus, the weight hourly space velocity (WHSV) of the liquid feed was about 2 g feed/g catalyst/hour. The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Results of three test runs for Catalyst A–E are summarized in Table I. All test data were obtained after 8 hours on stream.

TABLE I

| Run | Cat | Description | Yield C2 + C3 | Yield BTX | Coke % per Hr. |
|---|---|---|---|---|---|
| 1 | A | Alpha catalyst | 17 | 45 | 3 |
| 2 | B | Alpha catalyst + SiO$_2$ via PPMS | 19 | 46 | 1.6 |
| 3 | C | Alpha catalyst + Precalcine + SiO$_2$ via PPMS | 21 | 40 | 0.32 |
| 4 | D | Alpha catalyst + Precalcine + SiO$_2$ via PPMS (5X) | 21 | 36 | 0.25 |
| 5 | E | Alpha catalyst + SiO$_2$ via TEOS | 19 | 44 | 0.96 |

As can be seen, single treatments with no precalcination lowered coke from 3% per hour to 1.6 and 0.96% per hour (Runs 2 and 5). Run 3 shows the coke reduced to just 0.32% per hour with a single treatment when it is preceded by precalcination. Run 4 shows a slight further reduction to 0.25% per hour. As can be seen the desired olefin and BTX yields are essentially unaffected.

While this invention has been described in detail for the purpose of illustration, it is not to be construed as limited thereby but is intended to cover all changes and modifications within the spirit and scope thereof.

That which is claimed is:

1. A method of converting non-aromatic hydrocarbons to olefins and aromatic hydrocarbons comprising:
    contacting a feed comprising at least one non-aromatic hydrocarbon containing 2–16 carbon atoms per molecule with a catalyst prepared by a process consisting essentially of:
    combining zinc nitrate and gamma alumina to form a mixture, drying said mixture to form a dried mixture, and heating said dried mixture at a temperature within the range of 300–700° C. for 0.1–10 hours; thereafter treating with water vapor at a temperature within the range of 500–800° C. for a time within the range of 0.5–15 hours; thereafter combining with a zeolite having a SiO$_2$:Al$_2$O$_3$ molar ratio within the range of 40–70 to form a water vapor treated mixture; drying said water vapor treated mixture to form a dried water vapor treated mixture and calcining said dried water vapor treated mixture; thereafter contacting with a hydrocarbon solution of a silylating agent selected from poly (phenylmethyl)siloxane and tetraethyl orthosilicate to form a silylated mixture; and drying said silylated mixture to form a dried silylated mixture and calcining said dried silylated mixture; and
    recovering a reaction product comprising olefins containing 2–5 carbon atoms per molecule and aromatic hydrocarbons.

2. A method according to claim 1 wherein said olefins comprise ethylene and propylene and said aromatic hydrocarbons comprise BTX.

3. A method according to claim 1 wherein said zeolite is acid leached.

4. A method of converting non-aromatic hydrocarbons to olefins and aromatic hydrocarbons comprising:
    contacting a feed comprising at least one non-aromatic hydrocarbon containing 2–16 carbon atoms per molecule with a catalyst prepared by a process consisting essentially of:

forming a mixture of a zeolite having a $SiO_2:Al_2O_3$ molar ratio within the range of 40–70, zinc nitrate, and alumina to form a mixture; drying said mixture to form a dried mixture and heating said dried mixture at a temperature within the range of 300–700° C. for a time within the range of 0.1–10 hours; thereafter treating with water vapor at a temperature within the range of 500–800° C. for a time within the range of 0.5–15 hours to form a water vapor treated mixture; drying said water vapor treated mixture to form a dried water vapor treated mixture and calcining said dried water vapor treated mixture; thereafter contacting with a hydrocarbon solution of a silylating agent selected from poly (phenylmethyl)siloxane and tetraethyl orthosilicate to form a silylated mixture; and drying said silylated mixture to form a dried silylated mixture and calcining said dried silylated mixture; and recovering a reaction product comprising olefins containing 2–5 carbon atoms per molecule and aromatic hydrocarbons.

5. A method according to claim 4 wherein said zeolite is acid leached.

6. A method according to claim 4 wherein said olefins comprise ethylene and propylene and said aromatic hydrocarbons comprise BTX.

* * * * *